United States Patent [19]
Harada et al.

[11] Patent Number: 5,234,751
[45] Date of Patent: Aug. 10, 1993

[54] POROUS MATERIAL OF POLYTETRAFLUOROETHYLENE AND PROCESS FOR PRODUCING THE SAME

[75] Inventors: Akira Harada; Hiroshi Mano, both of Osaka, Japan

[73] Assignee: Sumitomo Electric Industries, Ltd., Osaka, Japan

[21] Appl. No.: 876,115

[22] Filed: Apr. 29, 1992

Related U.S. Application Data

[63] Continuation of Ser. No. 581,311, Sep. 12, 1990, abandoned.

[30] Foreign Application Priority Data

Sep. 12, 1989 [JP] Japan .................. 1-234760
Sep. 6, 1990 [JP] Japan .................. 2-236284

[51] Int. Cl.$^5$ .............................................. D03D 3/00
[52] U.S. Cl. ............................... 428/224; 264/41; 264/119; 264/127; 264/288.4; 264/288.8; 428/304.4; 428/311.1; 428/315.5; 428/315.7; 428/421; 428/422
[58] Field of Search ............ 428/421, 422, 315.5, 428/315.7, 311.1, 304.4; 264/41, 119, 127, 288.4, 288.8; 521/61

[56] References Cited

U.S. PATENT DOCUMENTS

| | | | |
|---|---|---|---|
| 4,371,554 | 2/1983 | Becker | 428/34.8 |
| 4,437,206 | 3/1984 | Becker | 428/36 |
| 4,532,316 | 7/1985 | Henn | 428/423.1 |
| 4,596,837 | 6/1986 | Yamamoto et al., | 264/127 |
| 4,598,011 | 7/1986 | Bowman | 428/224 |
| 4,707,314 | 11/1987 | Kawahigashi et al. | 264/127 |
| 4,760,102 | 7/1988 | Moriyama et al. | 264/127 |
| 4,990,294 | 2/1991 | Yen et al. | 521/61 |
| 5,098,625 | 3/1992 | Huang et al. | 264/127 |

FOREIGN PATENT DOCUMENTS

| | | |
|---|---|---|
| 42-13560 | 8/1967 | Japan . |
| 53-42794 | 11/1978 | Japan . |
| 58-145735 | 8/1983 | Japan . |
| 64-78823 | 3/1989 | Japan . |

*Primary Examiner*—James J. Bell
*Attorney, Agent, or Firm*—Kerkam, Stowell, Kondracki & Clarke

[57] ABSTRACT

A porous material of polytetrafluoroethylene consisting essentially of fibers of polytetrafluoroethylene. The porous material of PTFE is produced by heat-treating a molded article prepared by paste extruding of PTFE fine powder under such a condition that the heat-treated molded article shows at least one endothermic peak which appears between an endothermic peak position of the fine powder and an endothermic peak position of a sintered product thereof on a differential scanning calorimeter chart and then is stretched along at least one direction.

12 Claims, 3 Drawing Sheets

A photo of a surface of PTFE porous material according to the invention (x 5000)

A photo of a surface of PTFE porous material according to a known process (x 5000)

POROUS MATERIAL OF POLYTETRAFLUOROETHYLENE AND PROCESS FOR PRODUCING THE SAME

This is a continuation of application Ser. No. 581,311, filed Sep. 12, 1990 now abandoned.

BACKGROUND OF THE INVENTION

1. Field of the Invention

The present invention relates to porous material made of polytetrafluoroethylene (hereinafter, PTFE) which can be used as membranes for filters, diaphragms for batteries or electrolytic cells as well as covering tapes for electric cables or the like. More particularly, it relates to porous material of PTFE having finer pore size, improved permeability and dimensional stability.

The present invention also relates to a process for producing such porous material.

2. Description of the Related Art

Porous material of PTFE are used in a wide variety of industrial fields as partitions or diaphragms for fuel cells, membranes for filters, covering tapes for electric cables, membranes for analyzers or dialysis units, artificial blood vessels or the like. Recently, porous material of PTFE having finer pore size and improved permeability and dimensional stability are demanded in the applications of microfiltration, supports for high-functional membranes, air-filters or the like.

A variety of processes for producing the porous material of PTFE have been proposed as following:

(1) In Japanese patent publication No. 42-13,560, a non-sintered molded article which is produced by paste extrusion of PTFE is stretched at a temperature below a melting point of PTFE and then is sintered.

(2) In Japanese patent publication No. 53-42,794, a sintered molded article of PTFE is cooled down slowly to increase its crystallinity and then is stretched monodirectionally at a stretch ratio between 1.5 times and 4 times.

(3) Japanese patent laid-open No. 58-145,735 discloses a process comprising extruding a paste of fine powder of PTFE to prepare a non-sintered molded article, subjecting the molded article to heat-treatment at a temperature below a melting point of the PTFE fine powder but above a melting point of a shaped (sintered) product thereof under such conditions that an endothermic peak of the fine powder does not change on a differential scanning calorimeter chart (a crystal melting chart) and that the specific gravity of the shaped product becomes above 2.0, and then stretching the molded article at a temperature below the melting point of the powder.

(4) In Japanese patent laid-open No. 64-78,823, a molded article produced by paste extrusion of PTFE fine powder having number average molecular weight of lower than 1,000,000 is sintered and then is heat-treated to increase the crystallinity. After then, the resulting molded article is stretched along at least one direction.

However, in the case of the process (1) in which a non-sintered molded article is stretched, it is difficult to obtain porous material having finer pore sizes and improved in permeability. In the process (2) in which a sintered molded article is stretched, it is difficult to increase the stretch ratio, resulting in that a film obtained shows relatively lower porosity and hence lower permeability although the film obtained has fine pore sizes. In the case of process (3) in which stretching is effected after the heat-treatment, the pore size can be reduced but is not yet satisfactory and the heat-resistance is also insufficient. Relatively higher porosity as well as finer pore size can be realized in the process (4) in which a sintered molded article of PTFE whose number average molecular weight is lower than 1,000,000 is stretched. This process, however, is not sufficient to increase the permeability because it is difficult to increase the stretch ratio.

Therefore, the prior arts are not satisfactory to obtain such porous articles of PTFE as having finer pore size, higher porosity and improved heat-resistance. Still more, porous articles of PTFE produced by the prior arts are very shrinkable after they are dipped in solvents (solvent shrinkage). Such big shrinkage become a serious problem in some applications such as filters for organic solvent vapors because the filters shrink along a direction of thickness so that a gas flow rate is reduced.

Present inventors tried to solve the problems of the prior arts and found that the above-mentioned problems can be solved by subjecting a non-sintered molded article prepared by paste extruding of PTFE fine powder to such a heat-treatment condition that the resulting heat-treated molded article shows at least one endothermic peak which appears between an endothermic peak position of the fine powder (about 347° C.) and an endothermic peak position of a sintered product thereof (about 327° C.) on a differential scanning calorimeter chart (DSC chart), and then by stretching the heat-treated molded article along at least one direction.

This process looks like similar to the process disclosed in Japanese patent laid-open No. 58-145,735 in which the heat-treatment of a shaped product is effected before stretching. The later heat-treatment, however, is basically different from the present invention because the heat-treatment of this patent is effected under such a condition that no change of endothermic peaks of the fine powder occur on a DSC chart. In fact, in this patent, a substantially non-sintered molded article is stretched, so that the resulting porous material show relatively larger pore size, big thermal- and solvent-shrinkage, poor heat-resistance and insufficient dimensional stability. To the contrary, in the process according to the present invention, a molded article is changed to a partially sintered article (half-sintered article) by the heat-treatment and then is stretched, so that the resulting product has finer pore size, higher permeability, improved heat-resistance and dimensional stability. The present invention was completed on the basis of these findings.

Therefore, an object of the present invention is to provide porous material of PTFE having finer pore size, higher porosity and improved permeability.

Another object of the present invention is to provide porous material of PTFE which exhibit reduced heat-shrinkage and good heat-resistance (thermal stability).

Still another object of the present invention is to provide porous material of PTFE which exhibit reduced solvent shrinkage and improved dimensional stability.

SUMMARY OF THE INVENTION

The present invention provides a process for producing a porous material of polytetrafluoroethylene, characterized in that a non-sintered molded article prepared by paste extruding of polytetrafluoroethylene fine powder is subjected to such a heat-treatment condition that the heat-treated molded article shows at least one endothermic peak which appears between an endothermic peak position of the fine powder and an endothermic peak position of a sintered product thereof on a differential scanning calorimeter chart and then is stretched along at least one direction.

The present invention provides also a porous material made of polytetrafluoroethylene obtained by the above-mentioned process.

Chart (A): an endothermic peak of fine powder.
Chart (B): an endothermic peak of a heat-treated (but not-sintered) molded article.
Chart (C): an endothermic peak of a molded article which is heat-treated according to the present invention
Chart (D): an endothermic peak of a sintered molded article.

Figure 3:
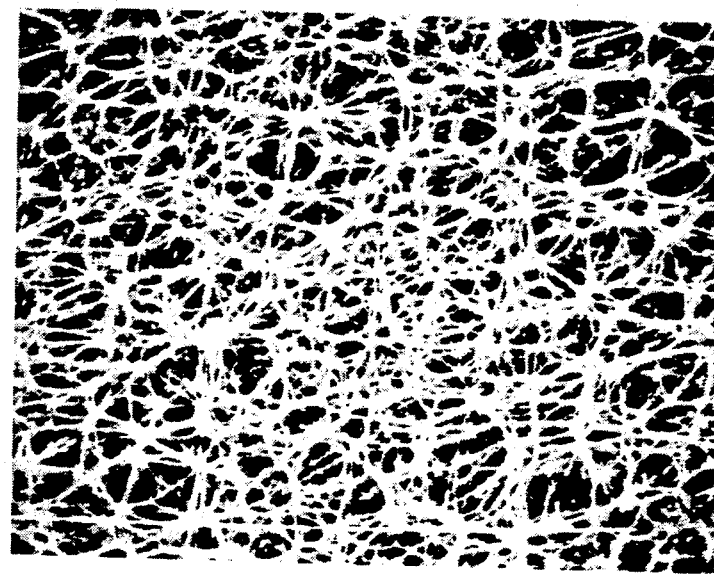
Figure 4:
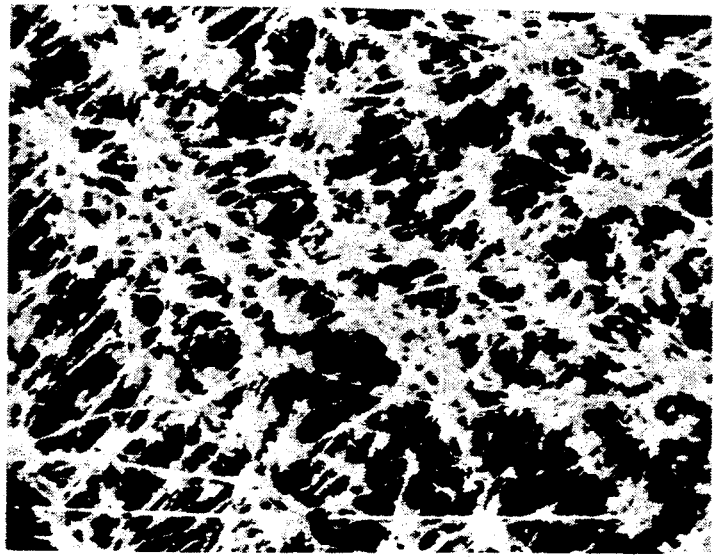

FIG. 3 and FIG. 4 are photos taken by a scanning electron microscope (enlarged by 5,000 times) each showing a surface of a porous material according to the present invention (FIG. 3) and a surface of a porous material prepared by known process (FIG. 4) respectively, each showing a configuration of fibers of PTFE.

Figure 1:
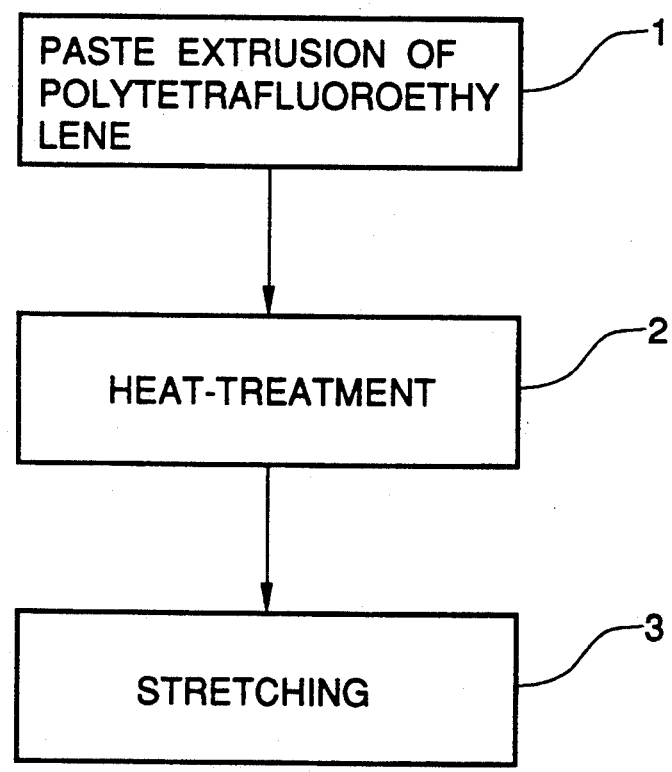
FIG. 1 shows basic three steps used for producing a porous material of PTFE according to the present invention.

The process for producing a porous material of polytetrafluoroethylene according to the present invention comprises basically three steps shown in FIG. 1. Namely, in a first step (1), a non-sintered molded article is produced by paste extruding of polytetrafluoroethylene fine powder. In a second step (2), the resulting non-sintered molded article is subjected to a heat-treatment under such a condition that at least one endothermic peak appears between an endothermic peak position of the fine powder and an endothermic peak position of a sintered product thereof on a differential scanning calorimeter chart observed on the heat-treated article. And finally, the heat-treated molded article is stretched along at least one direction in a third step (3). Of course, a variety optional steps can be added to the basic steps.

Now, the present invention will be described in more details, particularly we will explain meanings of terms used in the specification.

Polytetrafluoroethylene (PTFE) used in the present invention is fine powder having number average molecular weight of higher than 500,000, more preferably of 2,000,000 to 20,000,000.

"Paste Extrusion" means an extrusion molding technique in which a paste of PTFE powder mixed with liquid lubricant is used for producing unsintered articles of PTFE. The amount of liquid lubricant can be 15 to 40 part by weight, preferably 20 to 30 part by weight with respect to 100 part by weight of PTFE fine powder.

The liquid lubricant can be selected from a variety of lubricants which are used in the paste extrusion technique, including petroleum solvents or petroleum hydrocarbons such as solvent naphtha or white oil; triols; ketones; esters; silicon oils; fluorocarbon oils; solutions of these compounds in which a polymer such as polyisobutylene, polyisoprene or the like is dissolved; mixtures of them; water or aqueous solution containing surface active agents or the like.

In the paste extrusion, a mixture of the PTFE fine powder and the liquid lubricant is extruded below a sintering temperature of PTFE fine powder (lower than 327° C.) to obtain a molded article having a predetermined configuration. Before the paste extrusion, the mixture may be shaped into so-called pre-form. Generally, the mixture is compacted at a pressure of about 1 to 50 kg/cm$^2$ (preliminary compression molding) to obtain the pre-form. Then, the pre-form is fed to a paste extruder or is rolled by calender rollers. In a variation, the pre-form is rolled by calender rollers after a molded article is extruded out of an extruder.

The molded article can have any shape or profile such as sheet, tube, rod, stripe or film, provided that the molded article is stretchable after the heat-treatment. A thin film can be prepared by rolling a sheet of molded article.

Removal of the liquid lubricant out of the molded article after the paste extrusion can be carried by any known technique such as extraction, dissolution, heat-evaporation or the like. When a liquid lubricant having relatively higher boiling point such as silicon oil or fluorocarbon is used, removal of the liquid lubricant is preferably effected by extraction.

In addition to the liquid lubricants, the other additives requested in each application can be incorporated in the mixture. Such additives may be colorant such as pigment and inorganic fillers such as carbon black, graphite, silica powder, asbestos powder, glass powder, silicates or carbonates, metallic powders, metal oxide powders, metal sulfides powders or the like which improve abrasion-resistance, increase viscosity of the paste at low temperatures and facilitate formation of pores.

In order to assist formation of a porous structure, suitable powdery or liquid substances such as ammonium chloride, sodium chloride, the other plastics or rubbers which can be removed or decomposed by heating, extraction or dissolution can be incorporated in the mixture.

The heat-treatment is a heating operation for the non-sintered molded article prepared by the paste extrusion.

The PTFE fine powder or virgin powder have an endothermic peak at about 347° C. (generally, 347°±2° C.) on the DSC chart (crystal melting chart) of a differential scanning calorimeter. This endothermic peak is observed also on the non-sintered molded article prepared by the paste extrusion of the PTFE fine powder. This peak (about 347° C.) is called an endothermic peak position (or a melting point) of the PTFE fine powder on its DSC chart.

Usually, this endothermic peak at about 347° C. is accompanied with a shoulder or another lower peak at about 338° C. (DSC chart (A) in FIG. 2) but such shoulder or another lower peak is not observed in certain kind of the PTFE fine powders.

After the PTFE fine powder or a molded article obtained by paste extrusion thereof is sintered in a heating furnace which is kept at a temperature above the melting point of the PTFE fine powder, usually at 350° to 450° C., the above-mentioned endothermic peak at about 347° C. with its shoulder disappears but a new relatively lower endothermic peak appears at a position of 327° C. (generally, 327°±1° C.) on its DSC chart of a differential scanning calorimeter (DSC chart (D) in FIG. 2). This peak (about 327° C.) is called an endothermic peak position (melting point) of the sintered product.

According to the present invention, the heat-treatment is effected under such an extent or under such a condition that the heat-treated article has at least one peak appears between the endothermic peak position of the fine powder (about 347° C.) and the endothermic peak position of the sintered product thereof (about 327° C.) on its DSC chart. For this purpose, a non-sintered molded article prepared by paste extruding of polytetrafluoroethylene fine powder is heated at a temperature above the melting point of the sintered article (about 327° C.) for a time duration from several seconds to several ten minutes or much longer. This heat-treatment is preferably carried out in a heating furnace which is kept at a temperature between 330° C. and 450° C.

If the heat-treatment is not carried satisfactorily or sufficiently because of such a reason that the heating time is too short, the initial endothermic peak at about 347° C. accompanied with a shoulder at 338° C. (DSC chart (A) of FIG. 2) shifts to a single endothermic peak which appears at about 347° C. on the DSC chart (B). The condition corresponding to this DSC chart (B) means that sintering have not proceeded satisfactorily so that the molded article exhibits almost same behavior as the PTFE fine powder. In the process disclosed in the Japanese patent laid-open No. 58-145,735, the molded article is stretched before the above-mentioned change of the endothermic peak of the PTFE fine powder (about 347° C.) occur in the heat-treating stage.

Figure 2:
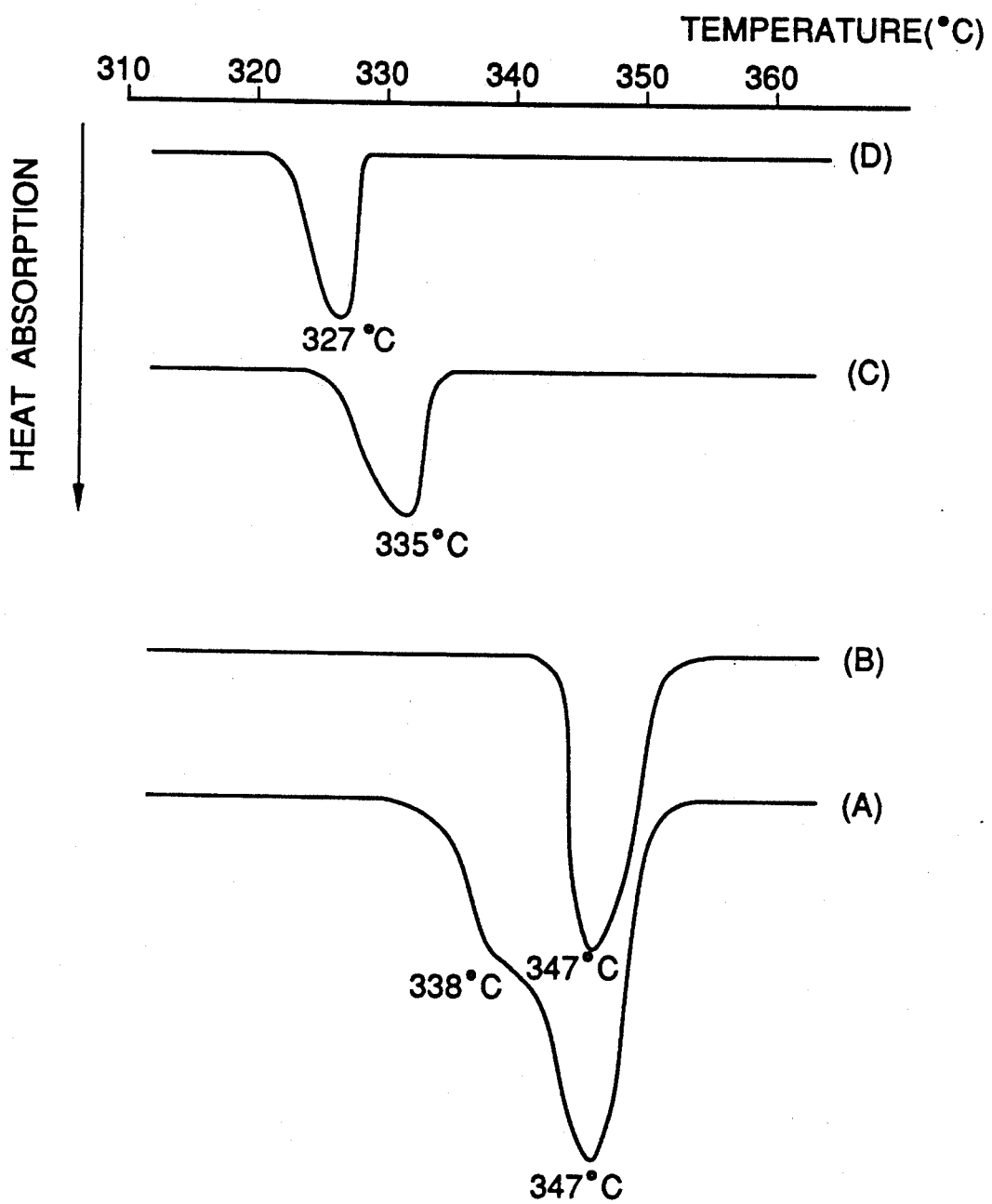
FIG. 2 shows endothermic peaks on differential scanning calorimeter charts (DSC charts) of PTFE fine powder or of molded articles obtained by paste extrusion of the PTFE fine powder, each endothermic peak corresponding to the following peak.

To the contrary, if the heat-treatment is continued further, the initial endothermic peak of the fine PTFE powder (at about 347° C.) disappears but another endothermic peak which may corresponds to a half-sintered material appears above the endothermic peak of the sintered material (at about 327° C.), as is shown in a DSC chart (C) of FIG. 2. In an embodiment shown in the DSC chart (C) of FIG. 2, a single endothermic peak appears at 335° C. In a molded article which exhibits the DSC chart (C) of FIG. 2, sintering is not finished completely but is interrupted before complete sintering. In the process according to the present invention, the resulting half-sintered molded article is stretched to produce the final porous material.

If required, the molded article can be further heat-treated to sinter the molded article after the stretching. In this case, as is stated above, the final sintered material exhibits a single endothermic peak at about 327° C. as is shown in the DSC chart (D) of FIG. 1.

It is important that the objects of the present invention can't be accomplished when molded articles that show endothermic peaks at respective positions corresponding to the DSC chart (A) (non-sintered condition), the DSC chart (B) (non-sintered condition) and the DSC chart (D) (sintered condition) are stretched. The porous material of PTFE having finer pore size, high permeability, improved heat-resistance and dimensional stability can be obtained only when a non-sintered molded article (half-sintered material) which have been heat-treated in such a manner that at least one peak appears between the endothermic peak position of the fine powder (about 347° C.) and the endothermic peak position of a sintered product thereof (about 327° C.) on the DSC chart is stretched.

Stretching is effected to at least on direction after the heat-treatment. The stretching of the molded article having suitable configuration such as sheet, rod or tube can be carried out mechanically by any known technique. For example, in the case of sheet-like molded articles, a winding velocity of a winding roller is increased with respect to that of a re-winding roller so that the molded article is stretched longitudinally or opposite side edges of the sheet are clamped and extended transversely in order to increase the width of the molded article. In the case of tubes or rods, it is easy to stretch them along an axial direction. The stretching can be effected in multi-stages successively, or carried out by biaxial stretching technique which is effected simultaneously or successively. Still more, the other variety of known stretching techniques can be used.

Usually, the stretching is effected at a temperature below a melting point of the sintered material (below 327° C.), preferably between 0° and 300° C. Stretching at lower temperature will produce porous material having relatively larger pore size and higher porosity, while stretching at higher temperature will produce porous material having relatively smaller pore size. In fact, the pore size and the porosity can be controlled by combining these parameters.

The stretch ratio (in area) is higher than 1.5 times. In order to increase the porosity, the stretch ratio is preferably selected higher than 5 times (in area) and more preferably between 6 times and 10 times (in area).

In biaxial stretching, each stretching along one direction is effected at a stretch ratio (in length) of 2 to 10 times, and the relative stretch ratio of longitudinal direction to transverse direction is suitably selected within a range of from 1:5 to 5:1. The stretching may be carried out by two steps comprising first stretching at about 20° C. and second stretching at a higher temperature.

The stretched product of PTFE porous material according to the present invention is ready to use in final application. However, when a higher dimensional stability is requested in the final product, the resulting PTFE porous material may be further heat-treated for example at 200° to 300° C. for about 30 minutes with maintaining a stretched condition by clamping opposite ends of the stretched porous material. Still more, the stretched porous material may be sintered in a heating furnace which is maintained at a temperature above the melting point of the PTFE fine powder (about 347° C.), for example at 350° to 550° C. for several ten seconds to several ten minutes in order to increase the dimensional stability.

The heat-treated porous material thus obtained can be further stretched to increase their porosity.

Porous material of PTFE obtained by the process according to the present invention may have a variety shapes such as sheet, tube or the like which depend on profiles of the molded articles prepared by the paste extrusion and are characterized by vary fine pore size and high porosity as well as improved permeability.

Porous material of PTFE obtained by the process according to the present invention have also higher heat-resistance (lower heat-shrinking property) and higher dimensional stability (lower solvent-shrinkage property).

The pore size depend on such factors as crystallinity of the molded article of PTFE or the stretch ratio or the like but is usually about 0.01 μm to 1 μm. Since a higher stretch ratio can be adopted, the porosity can be increased up to about 80 to 95% without spoiling the pore size. The pore sized and the permeability can be evaluated by "bubble point" and "Gurley number" which will be explained hereinafter.

The thickness of the porous material or porous sheet can be changed by adjusting the stretch ratio or the other factors. According to the present invention, a porous thin film having a thickness in the order of 10 to 30 μm can be produced easily.

The porous material of PTFE according to the present invention are stable against solvents. It was a problem in known porous material of PTFE produced by the prior arts that the porous material shrink in a direction of its thickness when the porous material are dipped in a solvent such as iospropanol (hereinafter, IPA) and then are dried under a restricted condition, so that the porous material become thinner in their thickness. The solvent shrinkage is strongly related to a gas flow rate ("Gurley number": a reciprocal number of the gas flow rate). Particularly, the gas flow rate of a porous material of PTFE drops sharply when the thickness of the porous material is reduced and, in the worst case, the gas flow rate drops to ½ to ¼ with respect to a value which is observed before the porous material is dipped in the solvent.

Therefore, filtering materials for air or organic solvent vapors prepared by the conventional porous material of PTFE, the gas flow rate decrease gradually in time due to their shrinkage along their thickness direction. In the case of a cartridge filter unit having a pleated filtering material which has an increased surface area and is contained in a small housing also, the pleated filtering material shrinks along the thickness direction when the cartridge is washed with organic solvent.

To the contrary, in the porous material according to the present invention, the solvent shrinkage can be reduced remarkably comparing to the conventional ones. In fact, although the solvent shrinkage depend on the heat-treatment conditions (half-sintering condition), the drop of the gas flow rate can be prevented to a minimum value. In particular, the endothermic peak of the molded article becomes nearer to the endothermic peak of the sintered material (327° C.), the solvent shrinkage will become to zero and hence the gas flow rate will not be spoiled substantially. To the contrary, even if the endothermic peak of the molded article becomes nearer to the endothermic peak of the fine powder of PTFE, the solvent shrinkage will not exceed 30% and hence the gas flow rate will not drop so seriously comparing to the conventional porous material of PTFE.

It is believed that the improved properties such as dimensional stability and permeability are contributed to their micro structures.

FIG. 3 is a photo of a scanning electron microscope (enlarged by 5,000 times) showing a surface of a porous material according to the present invention, while FIG. 4 shows a photo of a scanning electron microscope (enlarged by 5,000 times) showing a surface of a porous material prepared by a known process.

As is shown in FIG. 4, a network structure of the porous material prepared by known process comprises nodes made of resin mass, fibers connecting the nodes and hollow spaces or pores surrounded by the nodes and fibers. To the contrary, in a network structure of the porous material prepared according to the present invention has substantially no node but consists essentially of fibers alone as is shown in FIG. 3. This structure of FIG. 3 is believed to resist to shrinkage caused by solvent and hence to minimize drop of the gas flow rate.

The network structure of the porous material prepared according to the present invention which consists essentially of fibers alone is believed to be realized by the characterized heat-treatment of the present invention in which the molded article is heated up to a half-sintered condition in such an extent that fine powders of PTFE fuse partially and coagulate to each other so that fibrillation of PTFE at the stretching stage is facilitated. The fibrillation is much accelerated with increase of the stretch ratio and finally, a structure consisting of fibers alone is realized.

The porous material of PTFE according to the present invention possess finer pore size, high porosity and improved gas permeability as well as a smooth surface, higher mechanical strength, non-sticky property, lower frictional property and high flexibility and is uniform in quality. The porous material of PTFE according to the present invention also show lower solvent shrinkage and improved heat-resistance and dimensional stability.

In fact, the porous material of PTFE according to the present invention exhibit the IPA bubble point of higher than 1.0 kg/cm$^2$ and the IPA solvent shrinkage ratio of lower than 30% and the Gurley number of less than 100 sec. It is possible to obtain such a porous material of PTFE as exhibiting the IPA bubble point of higher than 1.0 to 3.0 kg/cm$^2$, the IPA solvent shrinkage ratio of lower than 15% and the Gurley number of less than 20 sec, or a porous material of PTFE as exhibiting the IPA bubble point of higher than 3.0 kg/cm$^2$, the IPA solvent shrinkage ratio of lower than 30% and the Gurley number of less than 100 sec by adjusting the operational conditions such as the heat-treatment condition. The evaluation methods will be described in details hereinafter.

The porous material of PTFE according to the present invention can be used in a wide variety of applications such as filtering materials, membranes, diaphragms or partitions, sliding materials, non-adhesive materials or the like and are particularly applicable to filtering materials for micro-filtration, supports for high-functional membranes or diaphragms, air filters or the like in which very fine pores and high permeability which are characteristic features of the present invention are advantageously utilizable. Still more, the porous material of PTFE according to the present invention can be utilized as filtering materials for chemicals, membranes for separating serum components, diaphragms for artificial lungs or the like which are used in the field of semiconductors, medical treatment or biochemistry.

The present invention provides porous material of PTFE having finer pore size, higher permeability (higher porosity), higher heat-resistance (lower heat-shrinkage) and higher dimensional stability (lower solvent shrinkage). The porous material according to the present invention are applicable in a wide variety of fields as filtering materials for micro-filtration, supports of high-functional membranes or diaphragms, air filters or the like.

Now, the present invention will be described in details by Examples and Comparative Examples but should not be limited to the Examples. In Examples and Comparative Examples, physical properties of material and products are measured as following:

Endothermic peak temperature on DSC chart

Endothermic peak is determined for a sample of about 10 mg, at a temperature elevation ratio of 10° C./min.

IPA bubble point

IPA (isopropanol) bubble point is determined by a method according to ASTM-F-316. When this value becomes higher, the pore size becomes smaller.

IPA flow rate

IPA (isopropanol) flow rate is determined by a method according to ASTM-F-317 at a differential pressure of 70 cm Hg. When this value become bigger, the permeability is improved.

Heat shrinkage ratio

Heat-shrinkage ratio is determined after a sample is left at 150° C. for 30 minutes.

Solvent shrinkage ratio

Solvent shrinkage ratio is measured after a sample is dipped in solvent (IPA) and dried under a restrained condition and is determined by change in thickness (%) of the sample between before and after the sample is dipped in the solvent according to the following equation:

$$\text{Solvent shrinkage ratio (\%)} = \frac{T - t}{T} \times 100$$

in which, "T" is a thickness before the sample is dipped in the solvent and "t" is a thickness after the sample is dipped in the solvent.

Gurley number

Gurley number is defined by a time duration during which air of 100 cm$^3$ can flow at a pressure difference of 12.4 mmH$_2$O through an area of one square inches (6.45 cm$^2$) and is determined by a method according to ASTM-D-726. We compared two values of Gurley number measured before and after the sample is dipped in the solvent (IPA).

EXAMPLE 1

230 g of white oil, as a liquid lubricant, was added to 1,000 g of PTFE fine powder: F-104 (a product of Daikin Kogyo Co., Ltd.) having a molecular weight of 4,000,000 to 5,000,000. The mixture was blended uniformly and was compacted at a pressure of 50 kg/cm$^2$ and then was extruded by a paste-extruder. A extruded sheet was rolled to obtain a sheet having a thickness of 0.3 mm, as a molded article. The molded article was dipped in trichloroethylene to remove the liquid lubricant.

Then, the molded article was heat-treated in a thermostatic oven at 340° C. Four samples each exhibiting a different endothermic peak on its DSC chart were prepared (one of them was a control sample which was not subjected to the heat-treatment).

Then, each sample was stretched at 275° C. to axial direction (the longitudinal direction) at a stretch ratio of 500% by a roller type stretcher and to width-wise direction at a stretch ratio of 500%. Then, the resulting stretched sheets were sintered at 500° C. for one minute with maintaining the stretched condition.

Physical properties of the resulting sintered products were determined. The results are summarized in Table 1.

TABLE 1

| | Example 1 | Comparative Example 1 | Comparative Example 2 | Comparative Example 3 |
|---|---|---|---|---|
| DSC chart | | | | |
| Endothermic peak temperature (°C.) | 335 | 347 (340*) | 347 | 327 |
| Heat absorbed (J/g) | 30 | 58 | 42 | 15 |
| IPA bubble point (kg/cm$^2$) | 2.37 | 2.27 | 1.75 | (**) |
| IPA flow rate (ml/min/cm$^2$) | 10.3 | 7.8 | 10.5 | — |
| Heat-shrinkage ratio (%) | | | | |
| longitudinal direction | 1 | 35 | 23 | — |
| transverse direction | 1 | 52 | 33 | — |
| IPA solvent shrinkage ratio (%) | 2 | 56 | 43 | — |
| Gurley number (sec) | | | | |
| before dipping | 10 | 15 | 12 | — |
| after dipping | 10 | 24 | 18 | — |

(note):
*: at a shoulder position,
**: pore was not formed

Table 1 reveals such a fact that the stretched sheet prepared by the process according to the present invention exhibits a higher bubble point and a finer pore size and shows a higher gas flow rate and hence is improved in permeability. Still more, the sheet shows a reduced heat-shrinkage ratio, good heat-resistance and an improved solvent resistance so that filtration of fluids can be carried out in a stable condition.

To the contrary, a sample (Comparative Example 1) which is prepared by stretching a sheet which is not subjected to the heat-treated shows poor permeability and poor heat-resistance and such a very serious solvent shrinkage as 56%. This means that the thickness of the sheet is reduced to 44% of the initial thickness and hence this sample shows very poor dimensional stability.

Another sample (Comparative Example 2) which is prepared by stretching a sheet which is subjected to such a heat-treated that is not enough to induce the change of endothermic peak (about 347° C.) of the fine powder shows a lower bubble point, relatively larger pore size and insufficient heat-resistance. Because this sample shows a higher solvent shrinkage of 43%, the dimensional stability is very poor.

In the case of still another sample (Comparative Example 3) which is prepared by stretching a sintered sheet, no porous material is obtained.

EXAMPLE 2

200 g of white oil, as a liquid lubricant, was added to 1,000 g of PTFE fine powder: CD-123 (a product of Asahi Glass Company, Ltd.) having a molecular weight of about 20,000,000. The mixture was blended uniformly and was compacted at a pressure of 100 kg/cm$^2$ and then was extruded by a paste-extruder. An extrudate was rolled to obtain a sheet having a thickness of 0.3 mm, as a molded article. The molded article was dipped in trichloroethylene to remove the liquid lubricant.

Then, the molded article was heat-treated in a thermostatic oven at 400° C. Four samples each exhibiting a different endothermic peak on a DSC chart were prepared (one of them was a control sample which was not subjected to the heat-treatment).

Then, the samples were stretched at 300° C. to axial direction (the longitudinal direction) at a stretch ratio of 300% by a roller type stretcher and to width-wise direction at a stretch ratio of 900%.

Physical properties of the resulting stretched products were determined. The results are summarized in Table 2.

TABLE 2

|  | Example 2 | Comparative Example 4 | 5 | 6 |
|---|---|---|---|---|
| DSC chart |  |  |  |  |
| Endothermic peak temperature (°C.) | 345 330 | 347 (338*) | 347 | 327 |
| Heat absorbed (J/g) | 28 | 62 | 49 | 18 |
| IPA bubble point (kg/cm$^2$) | 5.50 | 4.31 | 4.48 | (**) |
| IPA flow rate (ml/min/cm$^2$) | 3.8 | 2.0 | 1.8 | — |
| Heat-shrinkage ratio (%) |  |  |  |  |
| longitudinal direction | 23 | 41 | 43 | — |
| transverse direction | 27 | 59 | 23 | — |
| IPA solvent shrinkage ratio (%) | 22 | 73 | 51 | — |
| Gurley number (sec) |  |  |  |  |
| before dipping | 62 | 70 | 65 | — |
| after dipping | 70 | 118 | 99 | — |

(note):
*: at a shoulder position,
**: pore was not formed

Table 2 reveals such a fact that the stretched sheet prepared by the process according to the present invention possesses higher bubble point and finer pore size and shows a higher gas flow rate and hence is improved in permeability. Still more, the sheet shows a very good solvent resistance and hence is stable against solvents.

We claim:

1. A porous material of polytetrafluoroethylene characterized in that it is produced by steps including paste-extrusion, heat-treatment and stretching which is carried out at a stretch ratio of higher than 1.5 times and further characterized in that said porous material has a network structure consisting essentially of fibers of polytetrafluoroethylene and has an IPA bubble point of higher than 1.0 kg/cm$^2$, an IPA solvent shrinkage ratio of lower than 15%, and a Gurley number of less than 100 sec.

2. The porous material of polytetrafluoroethylene set forth in claim 1 wherein said porous material has an IPA bubble point of higher than 3.0 kg/cm$^2$ and an IPA solvent shrinkage ratio of lower than 30%.

3. The porous material of polytetrafluoroethylene set forth in claim 1 wherein said porous material is obtained by heat-treating a non-sintered molded article prepared by paste extrusion of polytetrafluoroethylene fine powder under such a condition that the heat-treated molded article shows at least one endothermic peak which appears between an endothermic peak position of the fine powder and an endothermic peak position of a sintered product thereof on a differential scanning calorimeter chart and then by stretching the heat-treated molded article along at least one direction.

4. The porous material of polytetrafluoroethylene set forth in claim 1 wherein said porous material has a shape of a sheet.

5. The porous material of polytetrafluoroethylene set forth in claim 1 wherein the network structure has substantially no nodes.

6. The porous material of polytetrafluoroethylene set forth in claim 1 which is produced by stretching after heat-treatment.

7. A process for producing a porous material of polytetrafluoroethylene characterized in that a non-sintered molded article prepared by extruding a paste of polytetrafluoroethylene fine powder is subjected to a heat-treatment under such a condition that the heat-treated molded article shows at least one endothermic peak which appears between an endothermic peak position of the fine powder and an endothermic peak position of a sintered product thereof on a differential scanning calorimeter chart and then is stretched along at least one direction.

8. The process set forth in claim 7 wherein said non-sintered molded article is stretched along at least two directions at an areal stretch ratio of more than 5 times.

9. The process set forth in claim 7 wherein the stretching is effected at a temperature between 0° and 300° C.

10. The process set forth in claim 7 wherein the heat-treated molded article is further heated after stretching.

11. The process set forth in claim 10 wherein said the heat-treated molded article is heated at a temperature above 200° C.

12. The process set forth in claim 11 wherein said the heat-treated molded article is heated at a temperature above 347° C.

* * * * *